G. T. STAMM.
APPARATUS FOR DRYING FRUIT.
APPLICATION FILED NOV. 29, 1915. RENEWED SEPT. 29, 1919.
1,346,986.
Patented July 20, 1920.
3 SHEETS—SHEET 1.
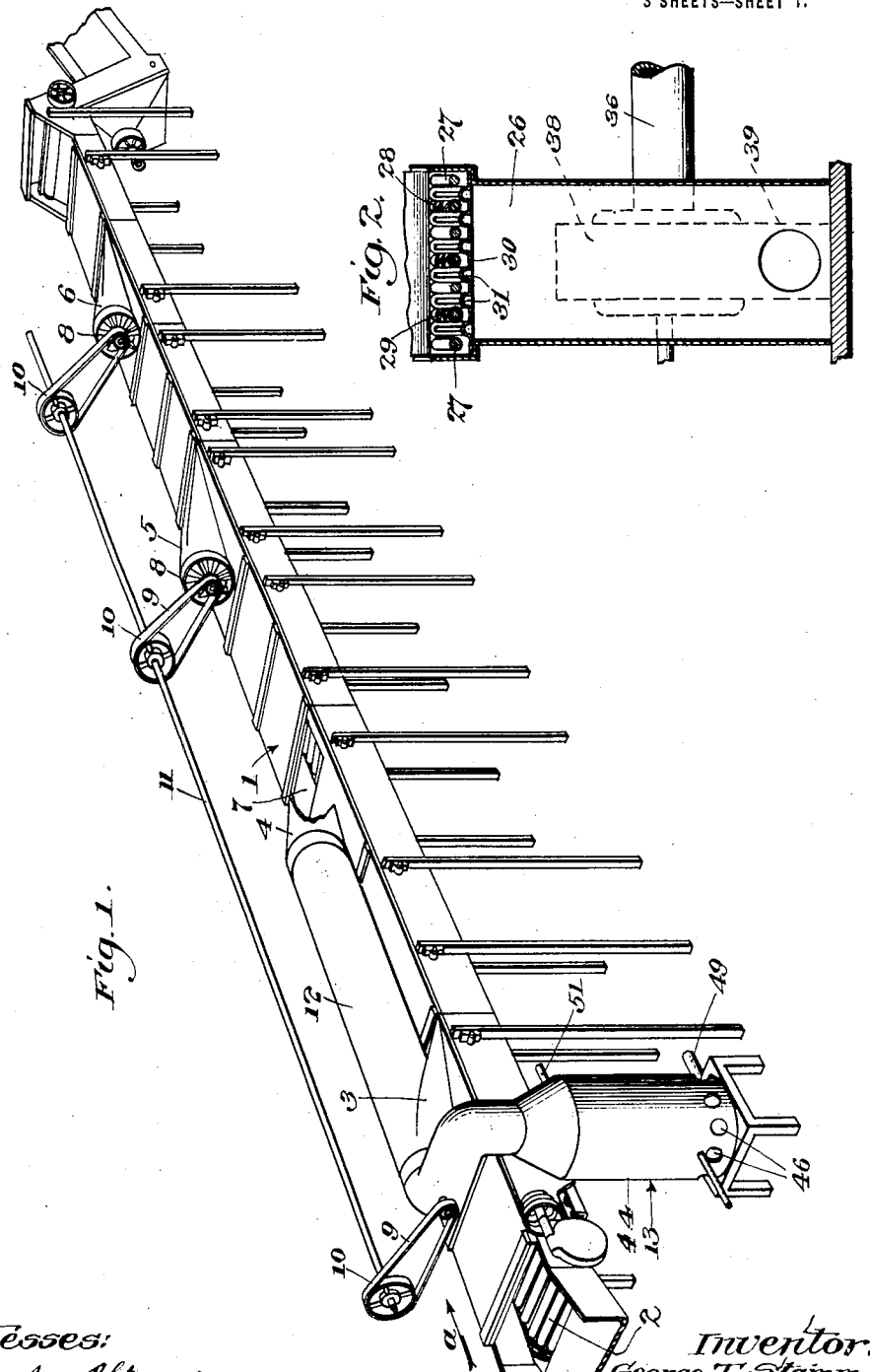

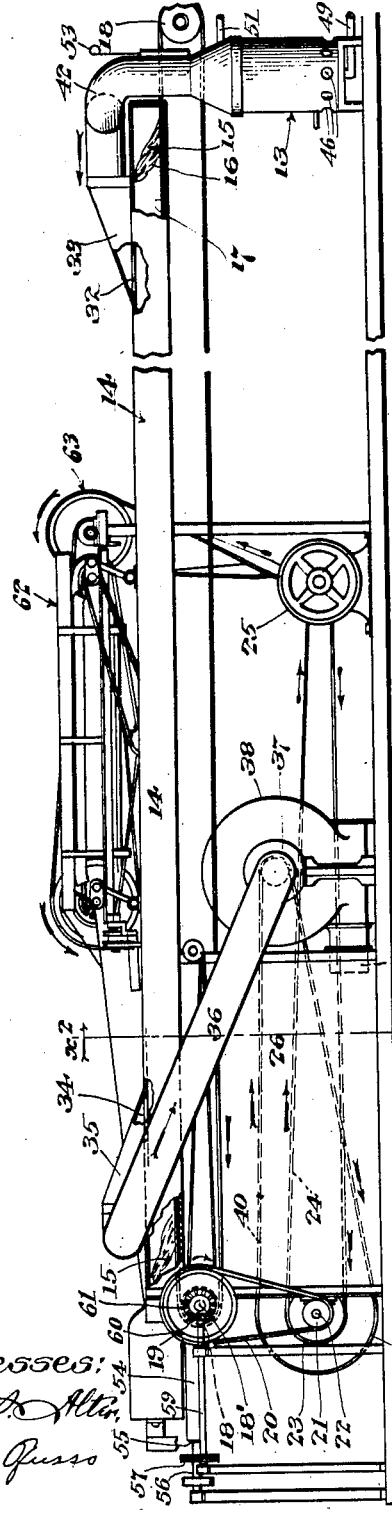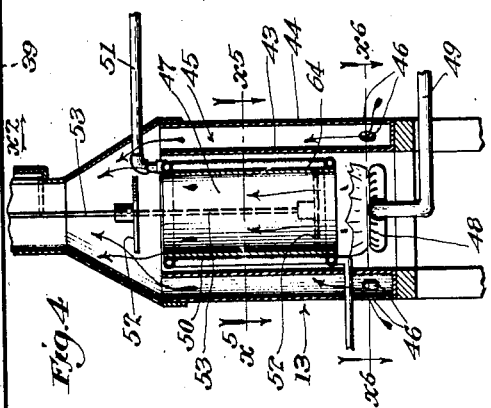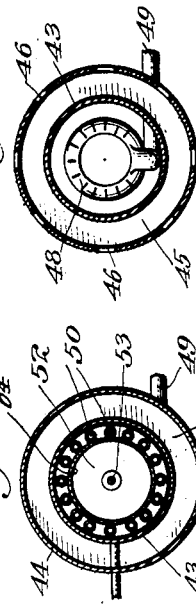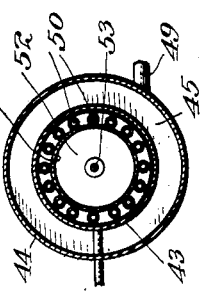

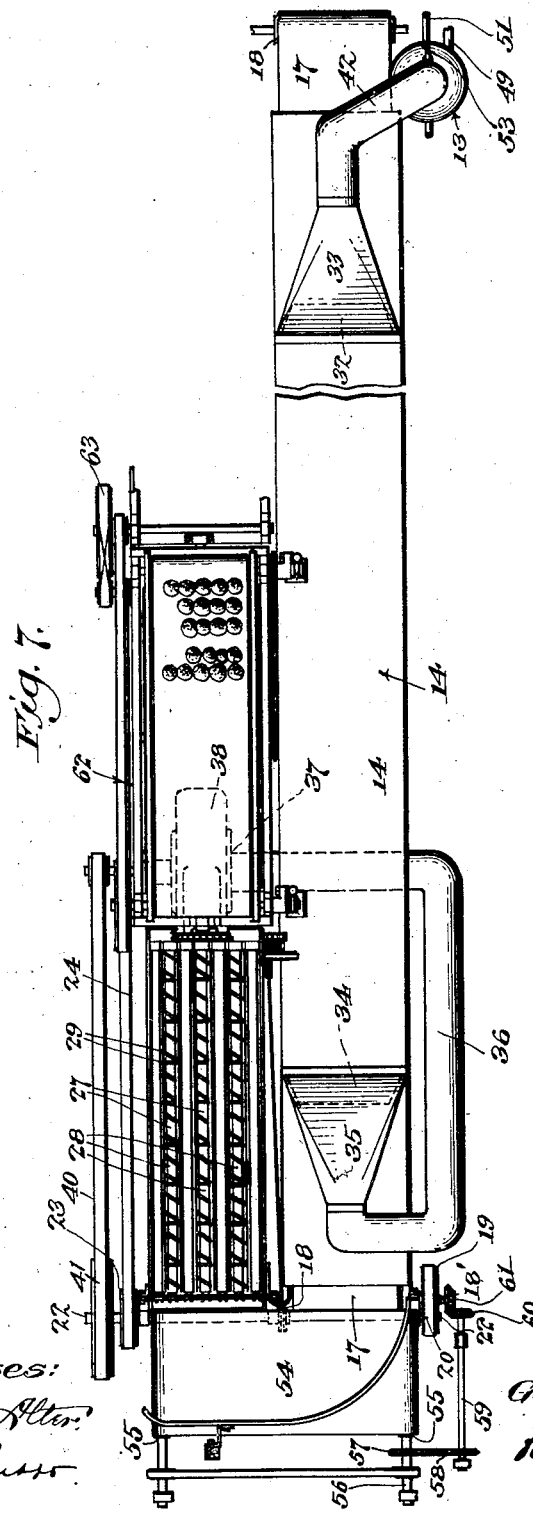

UNITED STATES PATENT OFFICE.

GEORGE T. STAMM, OF UPLAND, CALIFORNIA, ASSIGNOR TO FRED STEBLER, OF RIVERSIDE, CALIFORNIA.

APPARATUS FOR DRYING FRUIT.

1,346,986.    Specification of Letters Patent.    Patented July 20, 1920.

Application filed November 29, 1915, Serial No. 63,934. Renewed September 29, 1919. Serial No. 327,258.

*To all whom it may concern:*

Be it known that I, GEORGE T. STAMM, a citizen of the United States, residing at Upland, in the county of San Bernardino and State of California, have invented a new and useful Apparatus for Drying Fruit, of which the following is a specification.

An object of this invention is to minimize the cost of drying fruit.

Another object is to effect coloring of unripe citrus fruit such as oranges and the like.

Another object is to make provision for combining the drying and coloring operations.

Another object is to accomplish the foregoing with maximum effectiveness.

Another object is to make provision for mopping some of the water from the fruit before said fruit passes into the interior of the apparatus.

Another object is to provide effective inlet and outlet closures so as to prevent to a maximum degree the entrance of air from the atmosphere, and also to permit the fruit to pass through said closures without admitting any appreciable quantity of atmospheric air to the interior of the apparatus.

The accompanying drawings illustrate the invention embodied in two forms.

Figure 1 is a perspective view of one form of apparatus embodying the invention, a portion of one of the nozzles being broken away for clearness of illustration.

Fig. 2 is a fragmental sectional elevation on line indicated by $x^2$—$x^2$, Fig. 3.

Fig. 3 is a side elevation of an apparatus embodying the invention in a different form than that shown in Fig. 1, portions being broken away to contract the view and other portions being shown in vertical section for clearness of illustration.

Fig. 4 is a vertical mid section of the furnace or heater in Figs. 1 and 3.

Figs. 5 and 6 are plan sections on lines indicated by $x^5$—$x^5$, $x^6$—$x^6$, respectively, Fig. 4.

Fig. 7 is a plan view of Fig. 3.

In Fig. 1 there is provided a conveyer box 1 containing a suitable conveyer, in this instance, including rollers 2, said rollers all together forming part of an endless belt for conveying the fruit in the direction of the arrow $a$ and also forming the bottom of the box.

The conveyer box 1 is provided at suitable intervals with discharge nozzles 3, 4, 5 and 6 communicating with the interior of said box through discharge ports formed by slots 7. The nozzles 3, 5 and 6 are provided with fans 8 adapted to blow air through the ports 7, said fans being operated through belt and pulley connections 9, 10 by a countershaft 11 driven by any suitable means, not shown.

The nozzles 5, 6 communicate with the atmosphere so that atmospheric air is drawn by the fans 8 directly into said nozzles and is blown from thence into the conveyer box 1.

The nozzles, 3, 4 communicate through a manifold hot air supply pipe 12 with a furnace or heater 13 which will be described hereinafter.

In the form of the invention illustrated in Figs. 2, 3 and 7 there is provided a conveyer box 14 closed against the atmosphere at its opposite ends by suitable closures formed, in this instance, by mops 15 comprising filaments 16 of suitable structure such as strings or threads suspended from the top of the box, and said filaments may be somewhat longer than the space between the top and bottom of the box so that the ends of said filaments will rest upon the upper surface of the upper run of the conveyer belt 17, said upper run of the belt being supported by the bottom of the box.

The conveyer belt 17 runs over pulleys 18, one of which is driven through its shaft 18′ and pulley 19 by a belt 20 engaging a pulley 21 mounted on a shaft 22 that is provided with a second pulley 23 driven by a belt 24 operated by suitable power as a motor 25. At one side and below the level of the conveyer box 14 is provided an air chamber 26 above which is arranged a conveyer of suitable construction, in this instance said conveyer being formed by longitudinally extending spaced apart rods 27 having spiral projections 28 and having occasional transverse projections 29.

The top plate 30 of the air chamber 26 is provided with slots 31 between adjacent rods 27 so as to afford passage for air from the air chamber to the space above said chamber.

The rods 27 and spiral and transverse projections 28, 29 and the slots 31 are not claimed herein but form the subject matter of my earlier invention for fruit drier patented November 11, 1913, No. 1,078,110.

The box 14 is provided with an inlet port 32 communicating with an inlet nozzle 33 and said box is provided with a discharge port 34 communicating with a discharge nozzle 35 which is connected by a pipe 36 with the intake 37 of a blower 38, said blower having its exhaust 39 discharging into the lower portion of the air chamber 26. The blower 38 is operated by a belt 40 engaging a pulley 41 which is mounted on the shaft 22. The nozzle 33 is connected by a pipe 42 with a heater or furnace corresponding to the furnace shown in Fig. 1 and indicated by the same reference character 13.

The furnace or heater 13, as clearly shown in Fig. 4, is provided with concentric inner and outer spaced apart walls 43, 44, the space 45 between said walls communicating through inlet ports 46 with the atmosphere and said space communicating at the top with the fire box or burner chamber 47 which is formed by the space interiorly of the inner wall 43 and which is provided in its lower portion with a fuel burner 48 supplied with suitable fluid fuel through a fuel supply pipe 49 that is connected to a suitable source of supply, not shown.

The bottom of the air space 45 is closed from the fire box 47 but it is clear that the air entering the ports 46 and also the gaseous products of combustion from the fire box 47 together pass from the furnace into the hot air supply pipe 12, as in Fig. 1, or pipe 42, as in Fig. 3.

The fire box 47 may be provided with a water heating coil 50 adapted to supply hot water through a pipe 51 to the receptacle, not shown, in which the fruit is washed.

The fire box 47 may be provided with a damper 52 operated by a rod 53; said damper when in the position shown in dotted lines in Fig. 4 causing heat from the burner to spread outward between the vertical pipes of the coil 50, and when in its upper position, indicated in solid lines, allowing the heat from the burner to pass upward through the central part of the burner chamber and thence to the discharge pipe, with minimum heating effect on the coil.

Again referring to Fig. 7, at the discharge end of the rods 27 is a transverse conveyer belt 54 running around pulleys 55, one of said pulleys having its shaft 56 connected by gearing 57, 58 to a jack shaft 59 which is connected by gearing 60, 61 to the shaft 18'. At the receiving end of the rods 27 is a conveyer 62 driven through driving connections 63 by the motor 25, said conveyer being described in detail and claimed in the hereinbefore noted patent.

The process of treating the fruit in the apparatus described above is as follows:

Fuel will be furnished to the burner 48 and ignited and the fruit to be treated, for instance citrus fruit, will be washed in hot water which may be supplied through the hot water pipe 51 and the said fruit will be fed to the conveyer box 1 in Fig. 1 or to the conveyer 62 in Fig. 3, as the case may be.

In the form of the invention shown in Fig. 1, the fruit is carried by the rollers 2 through the conveyer box 1 and during its passage from the inlet end to the discharge end it is subjected for an interval of time to the gaseous products of combustion and heated air blown by the fans 8 through the ports 7 into the conveyer box.

In the form of the invention shown in Figs. 2, 3 and 7 the fruit discharges from the conveyer 62 onto the conveyer rods 27 and thence onto the transverse conveyer belt 54 and thence onto the conveyer belt 17. The belt carries the fruit through the mop 15 at the receiving end of said belt and said mop removes some of the water, and the filaments 16 conform closely to the surface of the fruit during its passage from one side of said mop to the other side, thus making it difficult for atmospheric air to pass said mop so as to reach the space between the mops. During the passage of the fruit from the intake mop to the outlet mop, it is subjected for an interval of time to the gaseous products of combustion and heated air sucked by the blower 38 from the heater 13 into the box 14 through the port 32. When the fruit reaches the outlet mop 15 it passes therethrough without admitting any material quantity of atmospheric air as has been described in connection with the introduction of the fruit through the intake mop.

The gaseous products of combustion and hot air are drawn from the box 14 through the port 34, nozzle 35 and pipe 36 into the blower 38 and thence discharged into the air chamber 26, whence they pass through the slots 31 and discharge against the fruit as it passes down the conveyer rods 27.

It is noted that a shell 64 is placed inside of the coil 50 so that when the damper 52 is in its lowermost position, shown in dotted lines Fig. 4, all the hot gases from the burner will be forced to pass throughout the length of the coil so as to heat said coil in minimum length of time.

From the foregoing it is seen that broadly I discharge the hot products of combustion onto the fruit to dry and tend to color said fruit, it being immaterial how this is done.

By moving the fruit while the coloring and drying are being effected, the fruit operated on is more uniformly colored than if said fruit were stationary, that is each individual fruit is subject to the same conditions as every other individual fruit from start to finish of the process. Uniformity in coloring and drying fruit is very important for the reason that the fruit brings better prices when marketed if the coloring as well as the size is uniform.

I claim:

1. An apparatus for drying fruit comprising a box, a fire box, a fuel-burner in the fire box, a nozzle discharging into the box near one end thereof, a hot air pipe connecting the fire box to the nozzle, means to convey fruit through the box beneath the nozzle discharge, and means to produce circulation of the hot air discharging from the nozzle through the box above the conveying means.

2. An apparatus for treating fruit comprising an open ended box to contain the fruit, a fire-box connected to the box, a fuel-burner in the fire-box, means to suck the gaseous products of combustion from the fire-box through the box containing the fruit, and closures at the ends of the box to admit the passage of fruit to and from the space between said closures.

3. An apparatus for treating fruit comprising an open ended box, means to supply hot gases to said box, and mops at the opposite ends of said box to admit the passage of fruit to and from the space between said closures.

4. An apparatus for treating fruit comprising an open ended box, a conveyer belt running through said box, mops at the end portions of the box having filaments suspended from the top of the box and resting on said belt, means to operate the belt, and means to supply hot gases to the space between said mops.

5. An apparatus for treating fruit comprising an open ended box, a conveyer belt running through said box, mops at the end portions of the box having strings suspended from the top of the box and resting on said belt, and a fire box communicating with the space between said mops.

6. In combination, a fruit container provided with an inlet port, and a heater connected to said inlet port, said furnace having spaced apart inner and outer walls and having a burner in the space inclosed by the inner wall, the inter-wall space communicating at the top with the space inclosed by the inner wall and there being a port opening through the outer wall to admit air to the inter-wall space.

7. An apparatus for treating citrus fruit comprising a conduit, a fire box, a fuel-burner in the fire box, means to discharge the hot products of combustion from the fire box into the conduit, and means to convey fruit through the conduit beneath the discharge of the hot products of combustion to thereby dry and color the peel of the fruit.

8. An apparatus for treating citrus fruit comprising a conduit, means to supply hot gases to said conduit, and closures to admit the passage of fruit to and from the space between said closures, the gases drying and coloring the peel of the fruit.

9. An apparatus for treating fruit comprising a conduit, means to convey fruit along the conduit, closures to admit the passage of fruit to and from the conduit, and means to supply hot gases to the space between the closures to dry and color the peel of the fruit.

10. An apparatus for treating citrus fruit comprising a conduit, means to supply hot gases to the conduit, and flexible closures to admit the passage of fruit to and from the space between said closures, the gases drying and coloring the peel of the fruit.

11. An apparatus for treating citrus fruit comprising a conduit, means to supply hot gases to the conduit, means to convey fruit through the conduit, and flexible closures to admit the passage of fruit to and from the space between said closures.

Signed at Los Angeles, California, this 22d day of November, 1915.

GEORGE T. STAMM.

Witnesses:
GEORGE H. HILES,
A. F. SCHMIDTBAUER.